United States Patent
Dejean

(10) Patent No.: US 9,135,249 B2
(45) Date of Patent: Sep. 15, 2015

(54) NUMBER SEQUENCES DETECTION SYSTEMS AND METHODS

(75) Inventor: Herve Dejean, Grenoble (FR)

(73) Assignee: XEROX Corporation, Norwalk, CT (US)

(*) Notice: Subject to any disclaimer, the term of this patent is extended or adjusted under 35 U.S.C. 154(b) by 373 days.

(21) Appl. No.: 12/474,500

(22) Filed: May 29, 2009

(65) Prior Publication Data

US 2010/0306260 A1    Dec. 2, 2010

(51) Int. Cl.
G06F 17/30    (2006.01)
G06F 17/27    (2006.01)
G06K 9/00    (2006.01)

(52) U.S. Cl.
CPC ...... *G06F 17/30011* (2013.01); *G06F 17/2745* (2013.01); *G06K 9/00469* (2013.01)

(58) Field of Classification Search
None
See application file for complete search history.

(56) References Cited

U.S. PATENT DOCUMENTS

| | | | |
|---|---|---|---|
| 7,295,708 B2 | 11/2007 | Chen et al. | |
| 7,730,085 B2* | 6/2010 | Hassan et al. | 707/776 |
| 8,122,032 B2* | 2/2012 | Schilit et al. | 707/749 |
| 8,175,875 B1* | 5/2012 | Dean et al. | 704/245 |
| 2004/0006742 A1 | 1/2004 | Slocombe | |
| 2006/0155703 A1 | 7/2006 | Dejean et al. | |
| 2006/0156226 A1 | 7/2006 | Dejean et al. | |
| 2006/0242145 A1* | 10/2006 | Krishnamurthy et al. | 707/6 |
| 2006/0248070 A1 | 11/2006 | Dejean et al. | |
| 2006/0277173 A1* | 12/2006 | Li et al. | 707/5 |
| 2007/0185837 A1 | 8/2007 | Gurcan et al. | |
| 2007/0196015 A1* | 8/2007 | Meunier et al. | 382/190 |
| 2008/0021701 A1* | 1/2008 | Bobick et al. | 704/9 |
| 2008/0065671 A1 | 3/2008 | Dejean et al. | |
| 2008/0077847 A1 | 3/2008 | Dejean | |
| 2008/0114757 A1 | 5/2008 | Dejean et al. | |
| 2008/0147588 A1* | 6/2008 | Leffingwell et al. | 706/48 |
| 2009/0046918 A1 | 2/2009 | Dejean | |
| 2009/0110268 A1 | 4/2009 | Dejean et al. | |
| 2010/0145902 A1* | 6/2010 | Boyan et al. | 706/54 |
| 2010/0293159 A1* | 11/2010 | Zhang et al. | 707/728 |
| 2010/0293196 A1* | 11/2010 | Roy et al. | 707/776 |
| 2011/0029545 A1* | 2/2011 | Clapper | 707/752 |

OTHER PUBLICATIONS

"Hierarchical logical structure extraction of book documents by analyzing tables of contents", Feng He, Xiaoqing Ding, Liangrui Peng, Dept. of Electronic Engineering, Tsinghua University State Key Laboratory of Intelligent Technology and Systems, SPIE-IS&T/vol. 5296 100084, Beijing, China, 2004.*

(Continued)

*Primary Examiner* — Rehana Perveen
*Assistant Examiner* — Raheem Hoffler
(74) *Attorney, Agent, or Firm* — Fay Sharpe LLP

(57) ABSTRACT

Numbered sequences detection includes (i) extracting one or more numbered item token patterns from a document comprising an ordered sequence of text units, each numbered item token pattern including an incremental portion and a fixed portion that matches at least one text unit of the document and (ii) identifying at least one numbered sequence in the document conforming with a matching numbered item token pattern of the extracted one or more numbered item token patterns. The identified at least one numbered sequence comprises an ordered sub-sequence of text units of the document that match the matching numbered item token pattern. The detection may further comprise determining that a second type of numbered sequence nests in the document between consecutive text units belonging to a numbered sequence of a first type, and optimizing one or more numbered sequences of the second type based on information provided by the determining.

20 Claims, 6 Drawing Sheets

(56) References Cited

OTHER PUBLICATIONS

"Structuring Documents According to Their Table of Contents" Hervé Déjean, Xerox Research Centre Europe, 6 chemin de Maupertuis, F-38 240 Meylan, France; Herve.Dejean@xrce.xerox.com; Jean-Luc Meunier, Nov. 2005 Xerox Research Centre Europe; 6 chemin de Maupertuis F-38 240 Meylan, France Jean-Luc.Meunier@xrce.xerox.com.*

* cited by examiner

SOME EXAMPLES OF NUMBERED ITEM TOKEN PATTERNS

| INITIAL SET OF STRINGS (ONE PER LINE) | NORMALIZATION (IGNORING PREFIX) | LEFT PART (PREFIX) | INCREMENTAL PARTS | RIGHT PART | FINAL PATTERN | INCREMENT POSITION |
|---|---|---|---|---|---|---|
| 45<br>46<br>47<br>48 | DD | | 5,6,7,8 | | D | 1 |
| CHAPTER 3.<br>CHAPTER 4. | D. | CHAPTER | 3,4 | . | CHAPTER D. | 1 |
| 1.1<br>1.2<br>1.3 | D.D. | | 1,2 | | D.D. | 1 |
| 2.1<br>2.2 | | | 1,2,3 | | | 2 |
| VOLUME II.<br>VOLUME III. | R | VOLUME | II, III | . | VOLUME R. | 1 |
| 1A<br>1B<br>2A | DX | | 1,2 | | DX | 1 |
| 2B<br>2C | DX | | A,B,C | | DX | 2 |
| SECTION 2.1.a<br>SECTION 2.1.b<br>SECTION 2.2.a<br>SECTION 2.2.b | D.D.x | SECTION | 1,2 | | SECTION 2.D.x | 1 |
| | | | a,b | | | 2 |
| 第一条<br>第二条 | C | 第 | 一,二 | 条 | | 1 |

*FIG. 2*

| POSSIBLE INDEXES | INSTANTIATED INDEX | PATTERN TYPE | HEAD | BODY [...] |
|---|---|---|---|---|
| 1 | 1 | PART D | PART 1 | - GENERAL |
| 1,1 | 1 | D.D | 1.1 | RELATED DOCUMENTS |
| 1 | NONE | X. | A. | Drawings and general |
| 1,2 | 2 | D.D | 1.2 | SUMMARY |
| 1 | 1 | X. | A. | This Section reuire |
| 2 | 2 | X. | B. | Related Sections: Th |
| 1 | NONE | D. | 1. | Division 1 Section " |
| 3 | 3 | D. | 3. | Division 2 Section " |
| 1,3 | 1 | D.D | 1.3 | DEFINITIONS |
| 1 | 1 | X. | A. | Remove: Remove and 1 |
| 2 | 2 | X. | B. | Existing to Remain: |
| 4 | 4 | D.D | 1.4 | SUBMITTALS |
| 1 | NONE | X. | A. | General: Submit the |
| 1,5 | 5 | D.D | 1.5 | JOB CONDITIONS |
| 1 | 1 | X. | A. | Items removed shall |
| 2 | 2 | X. | B. | Explosives: Use of e |
| 3 | 3 | X. | C. | Traffic: Conduct dem |
| 1 | 1 | D. | 1. | Do not close or obst |
| 4 | 4 | X. | D. | Damages: Promptly re |
| 5 | 5 | X. | E. | Utility Services: Fi |
| 2 | 2 | PART D | PART 2 | - PRODUCTS |
| 2,1 | 2 | D.D | 2.1 | MATERIALS |
| 1 | NONE | X. | A. | Barricade and fence |
| 3 | 3 | PART D | PART 3 | - EXECUTION |
| 3,1 | 3 | D.D | 3.1 | PREPARATION |
| 1 | 1 | X. | A. | Erect barricades, fe |
| 2 | 2 | X. | B. | Protect existing uti |
| 3,2 | NONE | D.D | 3.2 | DEMOLITION |
| 1 | 1 | X. | A. | Work with pneumatic |
| 2 | 2 | X. | B. | Dust Retention: Use |
| 1 | NONE | D. | 1. | Do not use water whe |
| 3 | 3 | X. | C. | Clean adjacent struc |
| 4 | 4 | X. | D. | Remove pavements and |
| 1 | 1 | D. | 1. | Saw cut concrete pav |
| 2 | 2 | D. | 2. | Saw cut existing pav |
| 3 | 3 | D. | 3. | Saw cut asphalt pave |
| 1 | NONE | X. | A. | General: From the si |

*FIG. 6*

NUMBER SEQUENCES DETECTION SYSTEMS AND METHODS

BACKGROUND

The following relates to the information processing arts, information retrieval arts, archiving arts, document structuring arts, and related arts.

There is ongoing interest in converting legacy documents to standardized formats to facilitate archiving, document searching and information retrieval, and other document storage and processing applications. A legacy document is a document formatted in a format other than the standardized format that is used for the archiving or other standardized document processing. Legacy documents may have various formats such as word processing formats, spreadsheet formats, rich text formats, plain text or ASCII formats, portable document format (PDF), or so forth. A single standardized format is usually selected, although the choice of standardized format can vary. The extensible markup language (XML) format is one format that is commonly used as the standardized format, although other formats such as standard generalized markup language (SGML) or hypertext markup language (HTML) are also suitable.

The standardized format provides a structured paradigm for formatting the documents. XML, for example, defines tags delineated by angle brackets of the form "< . . . >", possibly with a closing tag of the form </ . . . > defining a container. The precise meaning of the various tags can vary, and is defined for a particular XML document by a document type definition (DTD) section or other embedded or referenced document formatting definition. Because of advantages provided by a structured paradigm, conversion of a document in an unstructured format to a structured format such as XML can also be desirable in other contexts besides archiving or retrieval of legacy documents.

Converting an unstructured document to a structured document such as XML entails obtaining meaningful structural information about the unstructured document for use in the structuring. This can be done manually. However, to facilitate automated or semi-automated document conversion, it is advantageous to automatically identify structural features in a document.

Accordingly, substantial work has been directed toward the identification and delineation of structural features in unstructured documents. The following U.S. patent publications include the present inventor as inventor or co-inventor: U.S. 2009/0110268 A1 titled "Table of Contents Extraction Based on Textual Similarity and Formal Aspects"; U.S. 2009/0046918 A1 titled "Systems and Methods for Notes Detection"; U.S. 2008/0114757 A1 titled "Versatile Page Number Detector"; U.S. 2008/0077847 A1 titled "Captions Detector"; U.S. 2008/0065671 titled "Methods and Apparatuses for Detecting and Labeling Organizational Tables in a Document"; U.S. 2007/0196015 A1 titled "Table of Contents Extraction with Improved Robustness"; U.S. 2006/0248070 A1 titled "Structuring Documents Based on Table of Contents"; 2006/0156226 A1 titled "Method and Apparatus for Detecting Pagination Constructs including a Header and a Footer in Legacy Documents"; and U.S. 2006/0155703 A1 titled "Method and Apparatus for Detecting a Table of Contents and Reference Determination; all of which are incorporated herein by reference in their entireties. Work in this area goes back still further in time, as evidenced for example by Slocombe, U.S. 2004/0006742 A1 which is incorporated herein by reference in its entirety.

Numbered sequences present a rich and diverse source of structural information. Examples of numbered sequences in documents include: numbered chapters or other numbered document sections; numbered pages; numbered figures; numbered tables; numbered equations; and so forth. Automatic numbered sequences detection encounters complexities such as nesting (for example, section numbers may be nested within a numbered chapter), interspersing (for example, numbered figures captions may be interspersed amongst numbered equations); and so forth. Another complication is the wide diversity of numbering schemes. To provide just a few examples: "1, 2, 3, . . . "; "1.1, 1.2, 1.3, . . . "; "A., B., C., . . . "; "(i), (ii), (iii), (iv), (v), . . . "; "I-, II-, III-, IV-, V-, . . . "; and so forth. Existing techniques for automatic detection of numbered sequences typically make limiting assumptions on the layout of numbered items in the document (for example, assuming nesting) and about the numbering scheme. Some existing techniques also make limiting assumptions about the distance between numbered items in a numbered sequence, for example ignoring a potential "next numbered item" if it is too far away in the document from a "current numbered item". These limiting assumptions limit the number of different numbered sequences that can be detected by these techniques. For example, placing a distance limit on the detection can prevent detection of numbered chapter headings which may be spaced apart by large distances in the document. Using an assumed numbering scheme formalism eliminates the ability to detect numbered sequences that employ a numbering scheme that does not comport with the assumed numbering scheme formalism. An assumption of nesting of numbered sequences can result in failure to detect interspersed numbered sequences.

Accordingly, there remains interest in the development of improved numbered sequence detectors that make fewer limiting assumptions and consequently can detect a wider range of numbered sequences in documents.

BRIEF DESCRIPTION

In some illustrative embodiments disclosed as illustrative examples herein, a numbered sequences detector comprises a digital processor configured to perform a method including the operations of (i) extracting one or more numbered item token patterns from a document comprising an ordered sequence of text units, each numbered item token pattern including an incremental portion and a fixed portion that matches at least one text unit of the document and (ii) identifying at least one numbered sequence in the document conforming with a matching numbered item token pattern of the extracted one or more numbered item token patterns. The identified at least one numbered sequence comprises an ordered sub-sequence of text units of the document that match the matching numbered item token pattern.

In some illustrative embodiments disclosed as illustrative examples herein, a document processing system comprises: a numbered sequences detector as set forth in the immediately preceding paragraph; and a document structuring processor that is the same as or different from the digital processor of the numbered sequences detector and that is configured to generate a structured document that (1) corresponds to a document comprising an ordered sequence of text units and (2) includes structuring based on one or more numbered sequences identified in the document by the numbered sequences detector.

In some illustrative embodiments disclosed as illustrative examples herein, a method comprises: extracting one or more numbered item token patterns from a document comprising an ordered sequence of text units, each numbered item token pattern including an incremental portion and a fixed portion that matches at least one text unit of the document; identifying at least one numbered sequence in the document conforming with a matching numbered item token pattern of the extracted one or more numbered item token patterns, the identified at least one numbered sequence comprising an ordered sub-sequence of text units of the document that match the matching numbered item token pattern; and generating a structured document based on the document comprising an ordered sequence of text units and structured in accordance with the identified at least one numbered sequence.

In some illustrative embodiments disclosed as illustrative examples herein, a storage medium stores instructions executable by a digital processor to perform a method including identifying numbered sequences of at least two different sequence types in a document comprising an ordered sequence of text units. Each numbered sequence comprises an ordered sub-sequence of text units of the document in which the text units of the numbered sequence have an incremental portion indicative of the sequence type. A numbered sequence of a first type is identified having consecutive text units bounding a nested numbered sequence of a second type different from the first type. At least one numbered sequence of the second type is adjusted based on the constraint that it must be bounded by consecutive text units of a numbered sequence of the first type.

BRIEF DESCRIPTION OF THE DRAWINGS

FIG. 2 shows some examples of numbered item token patterns.

FIG. 6 shows the numbered items identified by the numbered items identifier of FIG. 1 as applied to the paragraph-segmented document of FIGS. 3-4.

DETAILED DESCRIPTION

Figure 1:
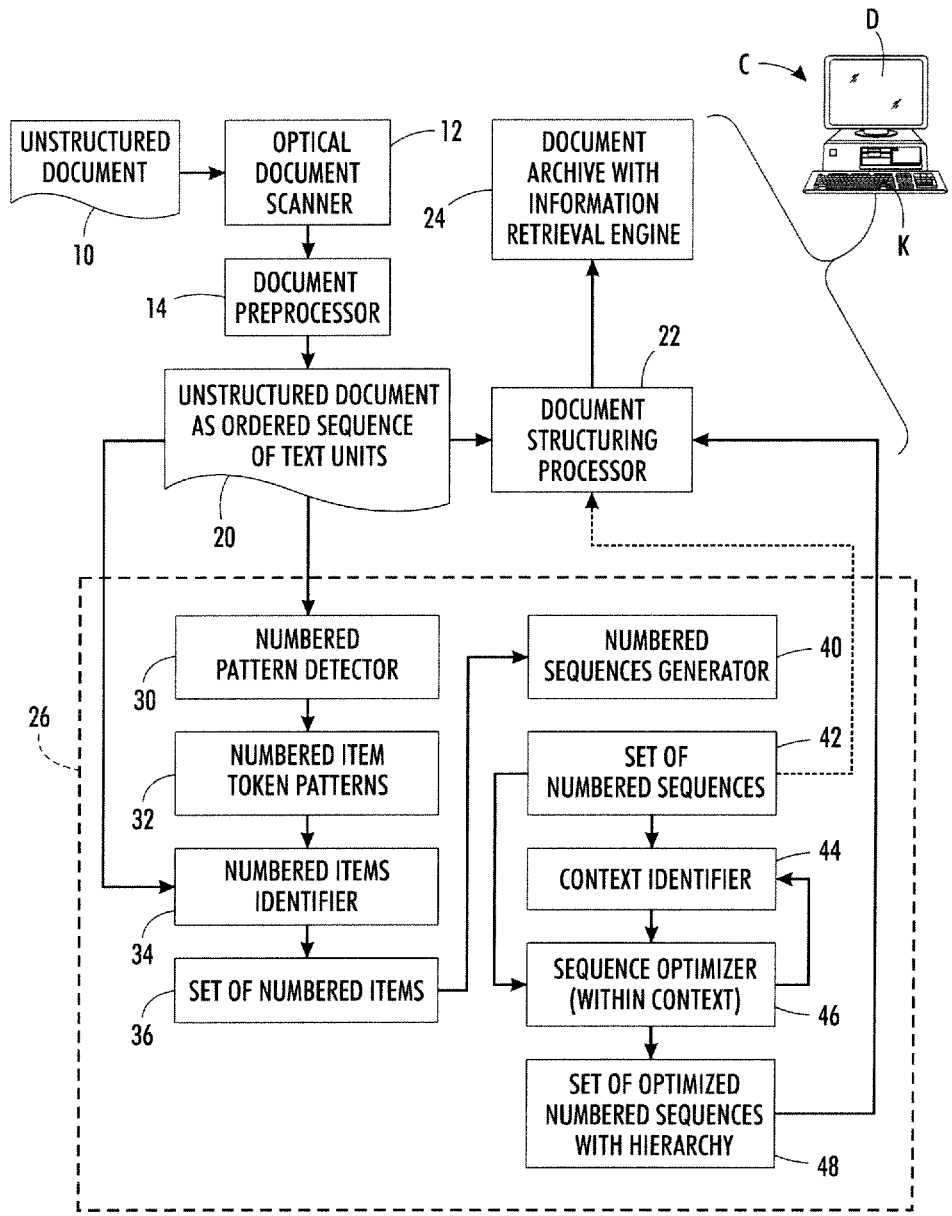
FIG. 1 diagrammatically shows a document archiving and information retrieval system including a numbered sequences detector.

With reference to FIG. 1, an illustrative document archiving and information retrieval system receives an unstructured document 10. The illustrative document archiving and information retrieval system is suitably embodied by an illustrated computer C having user interface devices such as an illustrated display D, keyboard K, mouse (not shown), or so forth. Although not expressly shown, it is understood that the computer C includes a digital processor (which may be a plurality of operatively interconnected processors or processor cores, such as in a dual-core digital processor, for example) and storage media such as a hard disk drive or other magnetic storage medium, random access memory (RAM), read-only memory (ROM), optical storage such as an optical disk drive, or so forth. The digital processor is particularly configured by suitable programming loaded from the storage media to operate as the disclosed illustrative document archiving and information retrieval system.

It will be understood that the illustrative computer C can be replaced by or augmented by other components such as a network server including a suitably configured digital processor and accessed by a digital data network. In this alternative embodiment, the network server embodies the document archiving and information retrieval system and the keyboard K and display D or other user interfacing components are used to interface with the network server. Various other embodiments such as a laptop computer, a mainframe computer, or so forth are also contemplated as embodiments of the digital processor configured to perform the disclosed document archiving and information retrieval operations and related numbered sequence detection operations.

Moreover, in some embodiments a digital storage medium such as the aforementioned a hard disk drive or other magnetic storage medium, RAM, ROM, optical storage such as an optical disk drive, or so forth stores instructions executable by a digital processor to perform the disclosed document archiving and information retrieval operations and related numbered sequence detection operations.

In the illustrated embodiment, the unstructured document 10 is received in a hardcopy or printed form, and is scanned in by a document scanner 12 to generate an image copy of the document that is processed by a document preprocessor 14 to generate an unstructured document 20 comprising an ordered sequence of text units. In a suitable approach, the document preprocessor 14 performs optical character recognition (OCR) on the scanned image copy of the document to generate document text, and segments the OCR'd document text into text units such as lines of text as they appeared on the original hardcopy or printout or equivalently as they appeared in the image copy of the document, or grammatical sentences suitably identified by pairing capitalized words with end punctuation such as a period, question mark, or exclamation point, or paragraphs, or so forth. The document preprocessor 14 optionally performs other operations such as employing spell-checking on the OCR'd document text to correct for OCR errors, or providing "mark-up" indicative of font characteristics, underscores, or other text presentation features, embedding scanned image content of the document 10 into the unstructured document 20 or, alternatively, storing the image content in a separate file or files that are linked with the unstructured document 20, or so forth. Optionally, the document preprocessor 14 is an interactive component that allows a human user to view and edit the unstructured document 20 using the user interface devices D, K. For example, a human user is optionally allowed to review the OCR'd text and manually correct OCR errors.

The unstructured document 20 comprising an ordered sequence of text units can be obtained or generated in other ways. For example, the unstructured document 20 comprising an ordered sequence of text units can be derived from a source word processing document that is converted to a suitable text format, in which case no hardcopy or printout of the document is needed. As another example, the source document can be unstructured document 20 comprising an ordered sequence of text units can be derived from a PDF file, either by converting embedded text content to a suitable text format or, if the PDF file is in image format by performing OCR on the PDF images to extract the text. Indeed, it is contemplated that the output of the optical document scanner 12 may be an image PDF file which can then be processed by performing OCR on the PDF images to extract the text and performing the segmenting into text units. It is also contemplated that the unstructured document 20 comprising an ordered sequence of text units may be generated or obtained in a suitably segmented textual format, in which case no preprocessing is employed.

However generated or obtained, the document 20 comprises an ordered sequence of text units. The text units are typically lines of text in a document, although it is also contemplated for the text units to be otherwise defined, such as the text units being grammatical sentences or paragraphs. The ordering is in the sense of the ordering of the text units in the document. For example, in the case of text units being lines of text in the document, the ordering corresponds to the order of the lines of text in the document. The unstructured document 20 is unstructured in that it does not include structural information of complexity suitable for use in archiving or information retrieval. However, it is contemplated for the unstructured document 20 to have some rudimentary structuring—for example, the unstructured document 20 may have delineation of text units in the form of lines of text, and addition delineation of paragraphs based on paragraph identifiers such as tab characters, indentation, or so forth, and/or additional delineation into physical pages of the original document, or so forth.

A numbered sequence in the document 20 corresponds to an ordered sub-sequence of text units in which each text unit is a numbered item. The phrase "ordered sub-sequence of text units" as used herein encompasses either a contiguous ordered sub-sequence of text units or a non-contiguous ordered sub-sequence of text units. An ordered sub-sequence of text units includes at least two text units and is ordered in the sense of the ordering of the text units of the sub-sequence in the document.

The unstructured document 20 is processed by a document structuring processor 22 to generate a structured document corresponding to the unstructured document 20. The structured document is stored in a suitable structured formalism, such as XML, SGML, HTML, or so forth, and includes structural annotations in the form of XML tags or the like. The structural annotations may, for example, include segmentation of the document in accordance with a table of contents or other organizational structure, identification of figure captions, identification of equations, or so forth. The generated structured document is added to a document archive 24, which optionally also includes an information retrieval engine for retrieving structured documents or portions thereof based on a text query, image query, or other user input. The structural annotations of the structured document advantageously facilitate identifying relevant sections or other relevant information for assisting in the information retrieval processing.

Because the unstructured document 20 is unstructured (except possibly for some rudimentary structuring such as paragraph or page delineation) the document structuring processor 22 employs information for the structuring derived from the content of the unstructured document 20, and optionally may further employ information for the structuring provided by a human user in an interactive fashion using the user interface devices D, K. For example, a human user is optionally allowed to identify structural features such as section headings using a mouse pointer or other input device.

Automated derivation of structural information from the content of the document 20 can be done in various ways. In the illustrative system of FIG. 1, a numbered sequences detector 26 analyzes the unstructured document 20 to identify one or more numbered sequences in the document which can be used as input for the document structuring. Each numbered sequence comprises an ordered sub-sequence of text units.

The numbered sequences detector 26 identifies one or more numbered sequences in the unstructured document 20 using a process including the following operations. First, a numbered pattern detector 30 extracts one or more numbered item token patterns 32 from the document 20. Each numbered item token pattern 32 includes an incremental portion and a fixed portion (which may be an empty string) that matches at least one text unit of the document 20. The numbered item token patterns 32 are used to identify numbered items. Because the numbered item token patterns 32 are derived from the unstructured document 20 by the numbered pattern detector 30, limiting assumptions about the numbering scheme or schemes used in enumerating numbered sequences in the document 20 are minimized. The extraction of the numbered item token patterns 32 from the document 20 also facilitates high recall.

One or more numbered sequences are then identified in the document 20. Each identified numbered sequence conforms with a matching numbered item token pattern of the extracted one or more numbered item token patterns 32. Each numbered sequence comprises an ordered sub-sequence of text units of the document 20 that match the matching numbered item token pattern. Toward this end, a numbered items identifier 34 identifies a set of numbered items 36 in the document 20. Each numbered item is a text unit of the document 20 that matches at least one pattern of the one or more numbered item token patterns 32. In some cases, a single numbered item may match two or more patterns of the numbered item token patterns 32. A numbered sequences generator 40 then organizes the set of numbered items 36 into a set of one or more numbered sequences 42. In determining the numbered sequences 42, the numbered sequences generator 40 may resolve ambiguities in which a single numbered item matches two or more patterns of the numbered item token patterns 32 so as to "instantiate" a numbered item corresponding to only one of the plural matching numbered item token patterns 32. The numbered sequences generator 40 searches the set of numbered items 36 for sequences of numbered items whose enumeration follows an expected pattern, such as "1., 2., 3., ... " or "1.1, 1.2, 1.3, ... ". The numbered sequences generator 40 does not limit the numbered sequences by distance between numbered items, and in some embodiments one or more missing or skipped items are allowed. Thus, for example, the numbered sequence "1, 2, 3, 5, 6" might be generated notwithstanding the missing item "4".

In some embodiments, the numbered sequences 42 are communicated to the document structuring processor 22 as the final output of the numbered sequences detector 26 (diagrammatically shown in FIG. 1 by a dotted arrow line connecting the set of numbered sequences 42 to the document structuring processor 22). Typically, the numbered sequences 42 are a good approximation of the numbered sequences actually existing in the document 20, and hence provide suitable information for structuring the structured document. However, the numbered sequences 42 may have some errors, and additionally no numbered sequences hierarchy is included in the set of numbered sequences 42.

To improve the accuracy of the numbered sequences, and optionally to further provide hierarchical information, an optimization of the numbered sequences is performed. Toward this end, an optimization context is defined for at least one numbered sequence based on layout (i.e., structural) information provided by the set of numbered sequences 42. In a suitable approach, a context identifier 44 identifies numbered sequences of one type as being bounded (or, at least usually bounded) by consecutive items of a numbered sequence of another type. In other words, the context identifier 44 identifies numbered sequences of the one type as being (at least typically) nested between consecutive items of a numbered sequence of the other type. The "outer" numbered sequence whose consecutive items bound the one type of numbered sequence then provides an optimization context for an optimization of the numbered items of the bounded or nested numbered sequence or sequences that is performed by a sequence optimizer 46. The optimization can take into account various information such as visual (e.g., font) information or the like. This process may optionally be repeated for various nestings of numbered sequences, as indicated by the looping arrow line flowing from the sequence optimizer 46 back to the context identifier 44.

In addition to enabling optimization of the nested numbered sequence or sequences, the optimization context identified by the context identifier 44 is optionally used to provide hierarchical information. In particular, the bounded or nested numbered sequence is assigned a relatively lower hierarchical level while the bounding or surrounding numbered sequence is assigned a relatively higher hierarchical level.

The output of the context identifier 44 and sequence optimizer 46 is a set of optimized numbered sequence 48, optionally including hierarchical information. This set of optimized numbered sequence 48 is suitably output to the document structuring processor 22 as the output of the numbered sequences detector 26, for use by the document structuring processor 22 in generating structure of the structured document that is then archived in the archive 24.

The illustrative numbered sequences detector 26 is described herein as a component of the illustrative document archiving and information retrieval system illustrated in FIG. 1. However, the illustrated numbered sequences detector 26 and variants thereof can also be used for other applications.

Having provided an overview of the illustrative numbered sequences detector 26, some additional aspects and embodiments of the various components 30, 34, 40, 44, 46 are next described.

The numbered pattern detector 30 identifies in the 20 document one or more numbered item token patterns that may be used by numbered items. In general, substantially Various types of elements in a document can be numbered, such as: chapters, sections, columns, lists, paragraphs, figures, equations, lines, or so forth. Numbered sequences in a document may reflect the document organization, and possibly hierarchical document organization (for example, with multi-incremental patterns. Accordingly, capturing these numbering elements can provide valuable information for the document structuring processor 22. Some numbering schemes used in documents are relatively simple: 1., a., or 1) for instance. Numbering schemes can also be more complex, as in the following example: Art. 12C$^{bis}$ (this is an example taken from a legal document). This pattern is composed of a fixed part (Art.) and three incremental parts: 12, c and bis. These different incremental elements correspond to a hierarchical organization of the document.

The numbered pattern detector 30 is based on the following premise: given a set of text units, are there portions of some of the text units that have an incremental relation, that is, a portion of some text units which varies in an incremental way. The processing performed by the illustrative numbered pattern detector 30 is as follows: (1) document text unit selection (line, sentence, or paragraph, for example) (2) (optional) declaration of specific incremental lists such as for Roman numerals; (3) text extraction from document text units and storage in a prefix tree at token level; and (4) for each prefix (path of the prefix tree), an incrementality test is performed on the nodes of the sub-tree: (i) the position and type of the increment is found as well as the fixed part, and (ii) a regular expression representing the pattern is generated. A numbered item token pattern is structured as having a fixed part (which may be an empty string) and incremental elements. For instance, the pattern [FIG. D.D] has Figure as fixed left part and two incremental elements (the D's). Each of these incremental elements provide an index: the value of the item in the sequence.

With reference to FIG. 2, some examples of numbered item token patterns are shown. FIG. 2 shows different examples of strings with normalization and the type and position of the incremental parts, where D denotes any digit, X denotes any uppercase letter string, x denotes any lower-case letter string, R denotes a Roman numeral digit, and C denotes a Chinese digit.

U.S. 2008/0114757 A1 titled "Versatile Page Number Detector" is incorporated herein by reference in its entirety, and discloses some numbered item token pattern detection techniques used in detecting page numbers. In embodiments disclosed herein, the techniques of U.S. 2008/0114757 A1 are expanded to encompass certain more complex numbered item token pattern detection such as patterns with multiple increments as may occur in a hierarchical numbering scheme (e.g., 1.3 where the lefthand "1" denotes a higher hierarchical level increment, and the righthand "3" denotes a lower hierarchical level increment). In the illustrative embodiments presented herein, the text of the document 20 is assumed to be encoded in accordance with the UNICODE encoding standard, although other encoding standards such as ASCII are also contemplated. The document 20 is assumed to be segmented into text units which correspond to lines or paragraphs (or any other level at which numbered items are to be detected). The text units are tokenized, where a token generally corresponds to a word or number but more generally denotes a string of nonspace characters delineated by space or punctuation characters. In some embodiments, the tokenization is performed along with the OCR processing by the document pre-processor 14. An example of possible input structure for the numbered item token pattern detection processing is given here:

```
<DOCUMENT>
    <PAGE width="612" height="792" number="1">
    <PARAGRAPH>
    <LINE >
        <TOKEN>Appears</TOKEN>
        <TOKEN>in</TOKEN>
        [...]
        </LINE>
    [..]
    </PARAGRAPH>
    [..]
    </PAGE>
    [...]
</DOCUMENT>
```

The document 20 is read and a prefix tree is generated. Each node corresponds to a token in the document. Each prefix (path) of length n corresponds to the first n tokens of existing lines in the document, and the subnodes of a given prefix correspond to the set of existing tokens occurring after this prefix. A left-to-right tree and a right-to-left tree is generated. For English or other left-to-right reading scripts, it is contemplated to generate only the left-to-right tree, although the right-to-left tree advantageously facilitates capturing numbered items in which the incremental portion is at the right-hand side, such as some equation numbering schemes used in scientific and technical papers. For right-to-left scripts, it is similarly contemplated to generate only the right-to-left tree.

Generating both the left-to-right tree and the right-to-left tree provides comprehensive coverage. Once the prefix tree is generated, it is processed using the following algorithm:

for a current prefix
1 the set of subnodes is normalized
2 for each normalization set:
2.1 if an incremental relation is found among the set of tokens, then a pattern is generated
2.2 the current prefix is added to the left part of the pattern.

In a typical numbered item token pattern, it is expected that the prefix is an empty string (represented by a single-token pattern using the above algorithm) or corresponds to a one (or perhaps two or three) token label of the document object, such as: Part, Chapter, Figure, equation, Appendix, or so forth. This expectation can be used in order to reduce the tree transversal. For example, the prefix can be assumed to be no longer than three tokens.

In order to compare the set of tokens, they are optionally normalized and searched for incremental relations among strings that share the same normalization. A suitable normalization comprises replacing each character of a string by the type of its type. If there is no type defined for this character, there is no replacement. At the character level, the following types are used in the illustrative examples: uppercase letter (normalized as "X"), lowercase letter (normalized as "x"), and digit (normalized as "D"). Other characters are not normalized. For example, the string "125,25" is normalized as "DDD,DD", the string "Confirmation" is normalized as "Xxxxxxxxxxxx", and the string "A.1" is normalized as "X.D", and so forth. Comparisons are only made where the normalized strings are identical. So, for example, the strings "asd13" and "00014" will not be compared since their respective normalizations, namely "xxxDD" and "DDDDD" are not equal. The optional normalization reduces noise and processing-time. The drawback of normalization is that elements such as "9" and "10" are not compared although they do in fact have an incremental relation. In order to detect this pattern, we need to have at least two elements having the same length (which is generally true in practice: if there is an item numbered "9" it will likely be preceded by an item numbered "8" in a numbered sequence).

Detection of an incremental relation can employ various approaches. One approach is the use of an encoding table. In this approach, two characters having a consecutive position in the encoding table are considered as having an incremental relation. Usually, the encoding order follows the alphabetical or numerical order of the script. In such cases, it may be sufficient to omit an explicit encoding table and rely upon the incremental portion of the numbered item token pattern conforming with an alphabetical or numerical sequence as such a sequence is defined in, for example, a string comparison library. For example, an ASCII string comparison library function may rely upon the alphabetical arrangement of characters in the ASCII representation (that is, for example, the letter "A" is represented in ASCII by the decimal value 65, the letter "B" is represented in ASCII by the decimal value 66, and so forth, so direct comparison of the ASCII numerical values yields the alphabetical sequence relationship). In this case, an explicit encoding table is not needed. When using an encoding table to detect if two elements have an incremental relation, the processing iterates through their characters, and if both characters have a consecutive encoding value, an incremental position if found.

Some incremental relations, such as Roman numerals or textual ordinals such as first, second, third, . . . , are not readily captured by a character-based encoding scheme. An ad hoc approach for incremental relation detection can capture these and other incremental relations (including, optionally, incremental relations that could be captured using an encoding table or reliance upon an alphabetical or numerical order). In an ad hoc approach, an ordered list is used to cover an incremental scheme. For example, the ordered list (first second third fourth fifth sixth seventh eighth . . . ) can cover the use of textual ordinals, where the ellipsis ( . . . ) denotes continuation of the ordered list for a length that is expected to be sufficient to capture all numbered items in the document 20 that may use a numbering scheme including textual ordinals. For Roman numerals, the ordered lists (i ii iii iv v vi vii viii ix x xi xii . . . ) and (I II III IV V VI VII VIII IX X XI XII . . . ) are suitably used. An incremental type is associated to each list. To detect two incremental elements using a given ordered list, a search is performed for substrings of text units that correspond to elements in the ordered list, and the string is tokenized as prefix, an incremental portion corresponding to the portion matching an element of the ordered list, and suffix. Text units having the same prefix and suffix are considered in incremental relation if the incremental portions correspond to consecutive elements of the list. For instance the two strings (I) and (II) are considered as incremental with the Roman counter as indicated by the ordered list (I II III IV V VI VII VIII IX X XI XII . . . ).

The numbered item token patterns optionally can integrate some hierarchical structure such as the sections of the number of their higher element in the document. An example is the form "D.D" where the first digit denotes a chapter and the second digit denotes a section of the chapter. This is referred to herein as a multi-index pattern, and includes two (or more) distinct incremental portions. Typically, no more than about four distinct incremental portions are included in a single numbered item. FIG. 2 shows some examples of the detection of the incremental parts for some strings. One string can generate several incremental parts in the case of a multi-index pattern.

The numbered item token patterns 32 can be represented in various ways. A convenient representation is a regular expression generated to correspond to the numbered item token pattern. A suitable approach for generating the regular expression is as follows: the left part (prefix) is added to the regular expression; the incremental part (or parts, in the case of a multi-index pattern) are replaced by their regular expression corresponding to the incremental type; and the right part is added. For numbering schemes detected using an ad-hoc ordered list, a specific regular expression corresponding to the ad hoc ordered list is used.

Once the numbered item token patterns 32 are generated, the next operation is to identify possible sequences items and to link them. This processing is performed by the numbered items identifier 34 and the numbered sequences generator 40. The numbered items identifier 34 scans the document 20 line by line (or, more generally, document unit by document unit), and each line is matched against each pattern of the set of numbered item token patterns 32. For every match, a numbered item token pattern is associated to the line (or text unit). The following terminology is used herein: the part of the line which matches the numbered item token pattern is called "head" and the remaining part of the line is called the "body". In some cases, the body may be missing (or suitably represented by an empty string, or single blank token, or so forth).

In some cases more than one numbered item token pattern may match a given line (or, more generally, a given text unit). For example, the text unit "7 a. Ten Topic" matches the numbered item token pattern "D" for which the head is "7" having index value 7 and the body is "a. Ten Topic". However, the text unit "7 a. Ten Topic" also matches the numbered item token pair "D x." for which the head is "7 a." with index values 7 for the lefthand index and "a" for the righthand index (this is an example of a multi-index pattern) and the body is "Ten Topic".

The numbered items identifier 34 generates the set of numbered items 36. The numbered sequences generator 40 then organizes the numbered items into the set of numbered sequences 42. For numbered items that match more than one numbered item token pattern, and/or that match a multi-index pattern, there may be more than one possible index for the numbered item. In such cases, the numbered items identifier 34 instantiates only one index according to its context. The numbered sequences generator 40 suitably employs processing similar to that described in Slocombe, U.S. 2004/0006742 A1 which is incorporated herein by reference in its entirety. However, the processing employed in the illustrative examples herein incorporate the notion of missing items (for example, as introduced by OCR errors or wrong segmentation), and also the notion of multi-increment items matching multi-index patterns.

The numbered sequence generation processing operates as follows in the illustrative examples. For each numbered item candidate c that is a candidate for inclusion in a numbered sequence, all subsequent candidates starting from the nearest one are tested against the indexes of the current candidate. The iteration stops when a preceding candidate p has an index that is compatible with the current candidate in that the preceding candidate p has an index value corresponding to index −1−m, where index is a possible index for the candidate numbered item c and m is a number of allowable missing elements. For a match, the indexes of both candidates c and p have to be of the same category, for example both Arabic digit, or both letter, or both Roman digit, or so forth. If such a previous item p is found, the index for the candidate c is instantiated accordingly. If the preceding candidate p already has an instantiated index, this latter is only used during the comparison of index values. The foregoing processing is suitably embodied by the following algorithm (referenced herein as "Algorithm 1"):

```
def generateSequences(self,list):
    for pos,item in enumerate(list):
        prelist = generate the list of previous items in a reversed order
        if prelist:
            max = length of prelist
            cpt = 0
            bFound = False
            bSameCounterSeen = False
            while cpt < max and not bFound:
                ii = prelist[cpt]
                if ii has no next nextItem:
                    ICommonCounters=
                    item.canBeNextOf(ii,nbMissingItemMax)
                    for all ICommonCounters c:
                        set c as active counter for item
                        link ii and item
                        bFound = True
                cpt += 1
```

The number of missing items m (denoted as nbMissingItem-Max in Algorithm 1) is a parameter of the method. In one illustrative approach, the number of missing items is set to one (1) if the document 20 was not obtained by OCR while the number of missing items is set to two (2) if the document 20 was obtained by OCR. This selection choice is merely illustrative, but reflects a likelihood that OCR introduces some errors leading to a higher likelihood of missing items that is accommodated by setting the number of missing items to a larger value in the case of the document obtained by OCR.

Algorithm 1 does not impose any distance limitation between two candidates. Optionally, a distance limitation may be incorporated in the identification of the preceding candidate p respective to numbered item candidate c. However, the use of optimization context in the processing performed by the optimization components 44, 46 provides much of the benefit of using a distance limitation without limiting the ability to accommodate numbered sequences that may have items spaced apart by large distances (such as, for example, chapter headings in a book).

The accuracy of the set of numbered sequences 42 output by the numbered sequences generator 40 is typically acceptable at the numbered item level, in that sequence items are most of the time correctly recognized. Accordingly, in some embodiments the set of numbered sequences 42 output by the numbered sequences generator 40 is the output of the numbered sequences detector 26, as indicated by the dashed arrow line connecting the set of numbered sequences 42 to the document structuring processor 22.

However, in some instances errors may be present in the links of the numbered sequences 42. There may be some inaccuracies in the links between items (that is, between preceding and next links). Errors in the links can be introduced by Algorithm 1, or by OCR or document segmentation errors. To correct such errors, an optimization sub-system such as the illustrative optimization components 44, 46 may be employed.

Some contemplated optimization approaches (not illustrated) apply an optimization algorithm over the whole document for numbered items of a given type. However, it is difficult to determine a satisfactory global criterion for such optimization which concurrently takes into account diverse features such as the distance between numbered items, formal features such as font, layout, or so forth, the length of the numbered sequences, and so forth.

The optimization performed by the illustrative optimization components 44, 46 is premised on the observation that when a numbered item type has only one sequence in the document, it is possible to apply an optimization algorithm, such as a Viterbi optimization in the illustrative described embodiments. In view of this, the context identifier 44 finds a structure which contains only one sequence of a given type. This structure is referred to herein as the optimization context: in such a context, an optimization algorithm is applied by the sequence optimizer 46 in order to select the best links. In this context, an efficient optimization criterion is the length of the numbered sequence.

In describing illustrative operation of the context identifier 44, the following terminology and notation is used: a first type of numbered sequence t1 is an optimization context for a second type of numbered sequence t2 if and only if no more than one numbered sequence of type t2 occurs between any two items of a numbered sequence of type t1. This often (although not always) corresponds to a hierarchical relation between numbered sequences of the first and second types in which numbered sequences of the first type have a relatively higher hierarchical level and numbered sequences of the second type have a relatively lower hierarchical level. More generally, this condition corresponds to the notion of container: one document element contains only one sequence of a given type. To illustrate, a chapter contains only one sequence of type "Figure D.D" if the first index of the pattern "Figure D.D" corresponds to the chapter number and the second index of the pattern corresponds to the figure number.

To being the optimization context identification, all type (that is, pattern) bigrams (t1, t2) are identified, where again t1 is under consideration as an optimization context for t2. The algorithm (referenced herein as "Algorithm 2") is as follows:

```
For each type t1 in the pattern list:
    for each sequence s of type t1:
        for each item in s:
            for each type t2:
                count the number of sequences of
                    type t2 between item and next(item)
```

Algorithm 2 yields a count of the number of sequences of type t2 between each two consecutive items of numbered sequences of type t1. A bigram (t1, t2) is identified as defining an optimization context in which numbered sequences of type t1 provide optimization context for numbered sequences of type t2 if the majority of counts of sequences of type t2 is one in the context t1 (that is, between two consecutive items of type t1). In some instances, a sequence type t1 may serve as the optimization context for more than one other sequence type. For example, (t1, t2) and (t1, t2') may both satisfy Algorithm 2, where t1, t2, and t2' are three different types.

Once an optimization context t1 is found for a given type t2, a formal model for items of the numbered sequence type t2 is computed. The model is used for scoring the numbered sequence items of type t2. A Viterbi algorithm or other optimization algorithm is performed using the optimization contexts respective to the scores or weights.

Operation of the sequence optimizer 46 including the formal model computation and Viterbi optimization is next described.

In order to provide weights for the Viterbi algorithm a machine learning approach is used to generate a model for items of type t2. The positive examples for the machine learning are taken as the items of the longest sequence of type t2, since the longest sequence of type t2 output by the numbered sequences generator 40 is expected to include mostly "correct" examples of items of type t2. Negative examples are randomly drawn from numbered sequences having types other than the type t2. In a suitable approach, n negative examples are drawn for each positive example (default n=5)). The model computation follows the following illustrative algorithm (referenced herein as "Algorithm 3"):

For type t2:
1. the longest numbered sequence of type t2 is selected and its items are used as positive examples. (a minimal length is required)
2. Negative examples are drawn randomly from other numbered sequences having types other than t2
3. A model is learnt with this training set.
4. A cross-validation step is performed, and the model is thrown if it fails the cross-validation step.
5. All the items having the current pattern are checked against this model and scored.

In step 3 of Algorithm 3, the learning in some embodiments employs a logit algorithm, although other machine learning algorithms can be used. In step 4, a suitable cross-validation evaluation is the (f−1) score, although again other validation operations can be used to validate the model. The model can employ various information about the numbered items as features, such as font information (e.g., font size, whether text is in boldface or italicized, or so forth), a distance d between the head and the body of the item, or so forth.

Although a machine learning approach for defining the weights is described with illustrative reference to Algorithm 3, it is to be understood that other approaches for assigning weights to the numbered items can also be used, such as heuristic algorithms, user-defined weighting algorithms, or so forth.

Once the optimization context (t1, t2) is determined for a sequence type t2 using Algorithm 2, and the sequences items are assigned weights using the formal model generated by Algorithm 3. A suitable algorithm (referenced herein as "Algorithm 4") is applied:

```
For optimization context type t1:
    for each sequence s of type t1:
        for each item in s:
            for each type t2 in context(t1):
                optimize the sequence of type t2
                    between item and next(item)
```

The illustrative applications of Algorithm 4 employ the Viterbi algorithm for the optimization, although other optimization algorithms are also contemplated.

Figure 3:
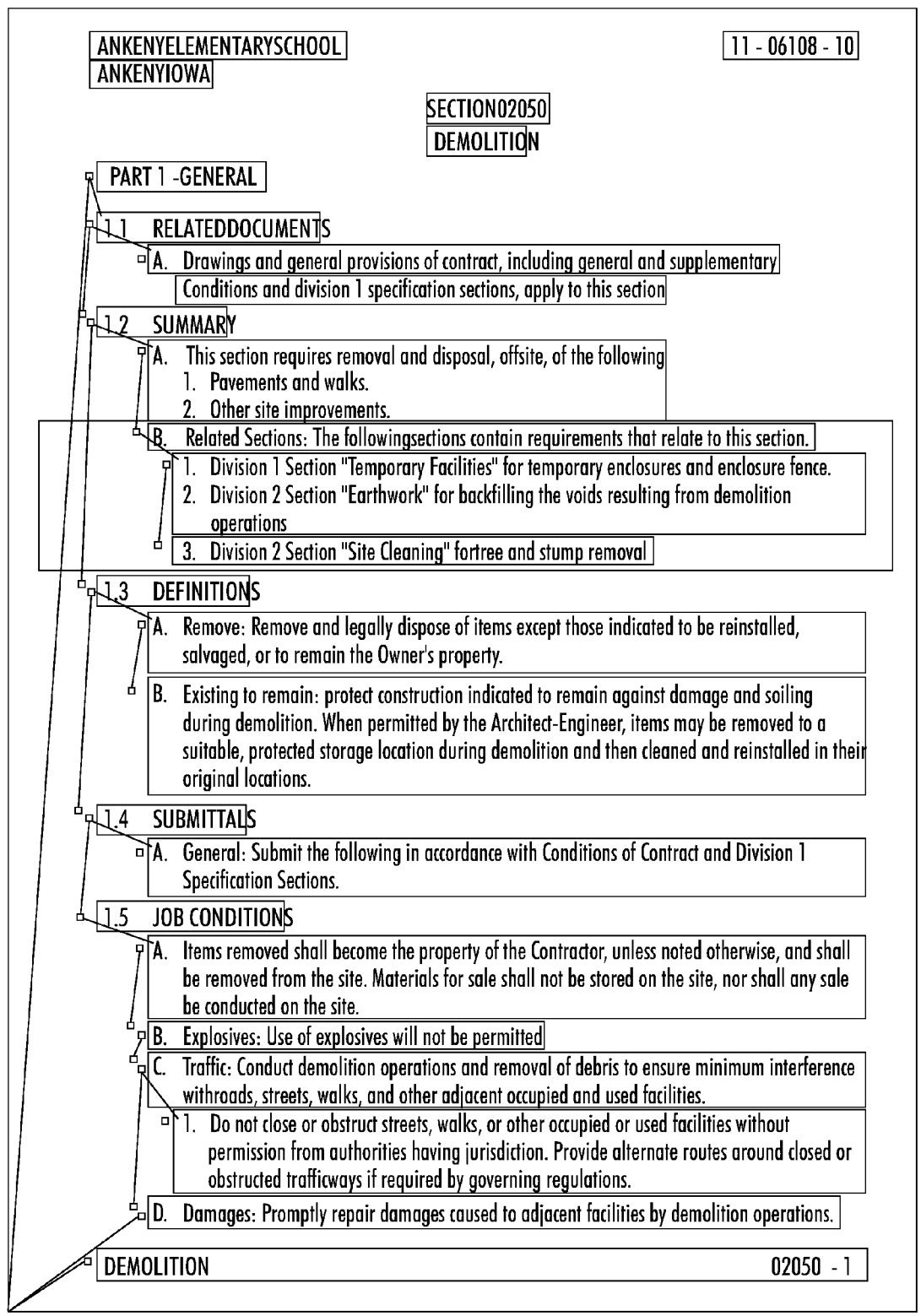
FIGS. 3 and 4 show first and second pages, respectively, of a document example used for testing the numbered sequences detector of FIG. 1, in which the document is segmented into paragraph text units and links computed by the numbered sequences detection are diagrammatically indicated.
Figure 4:
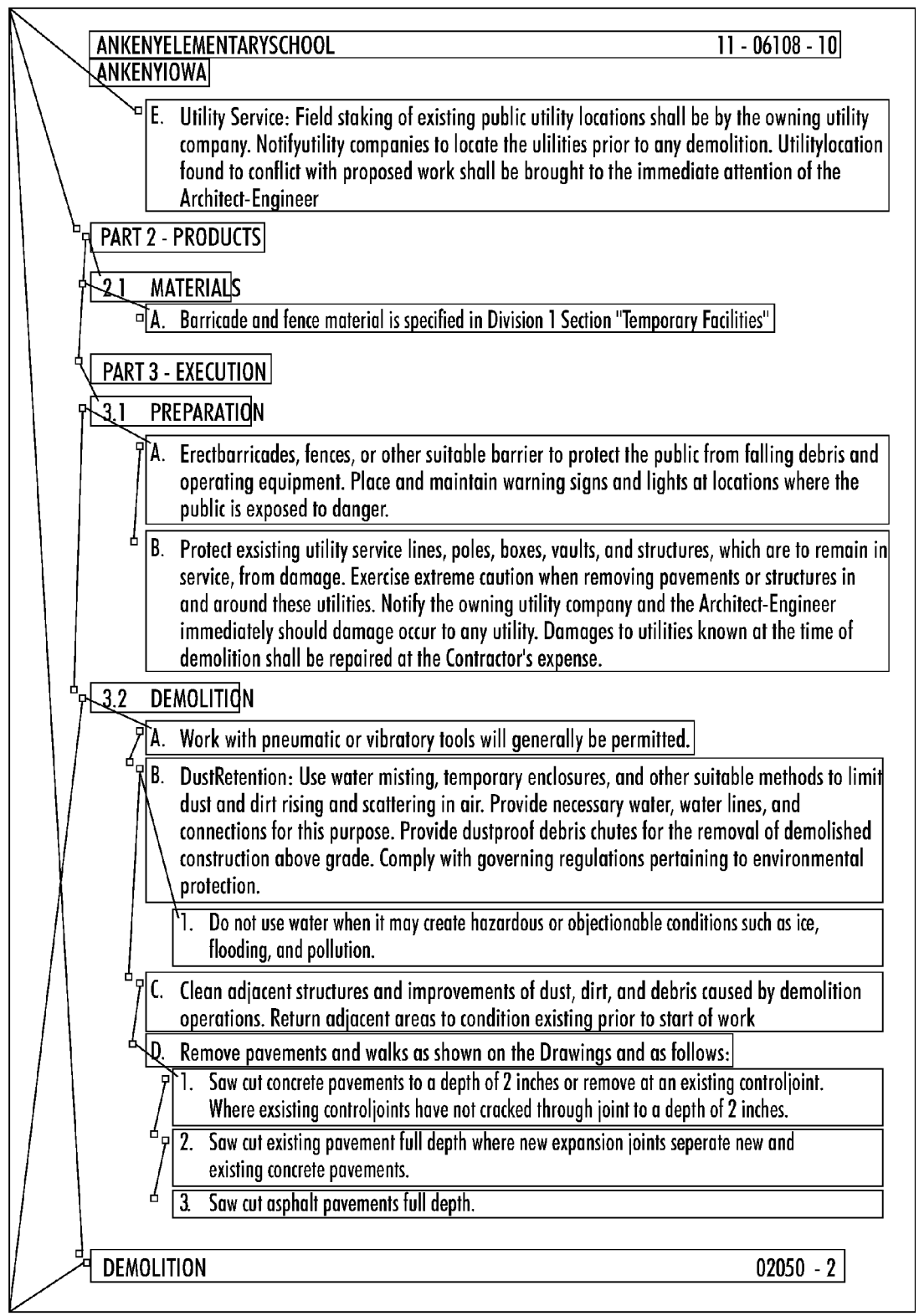
Figure 5:
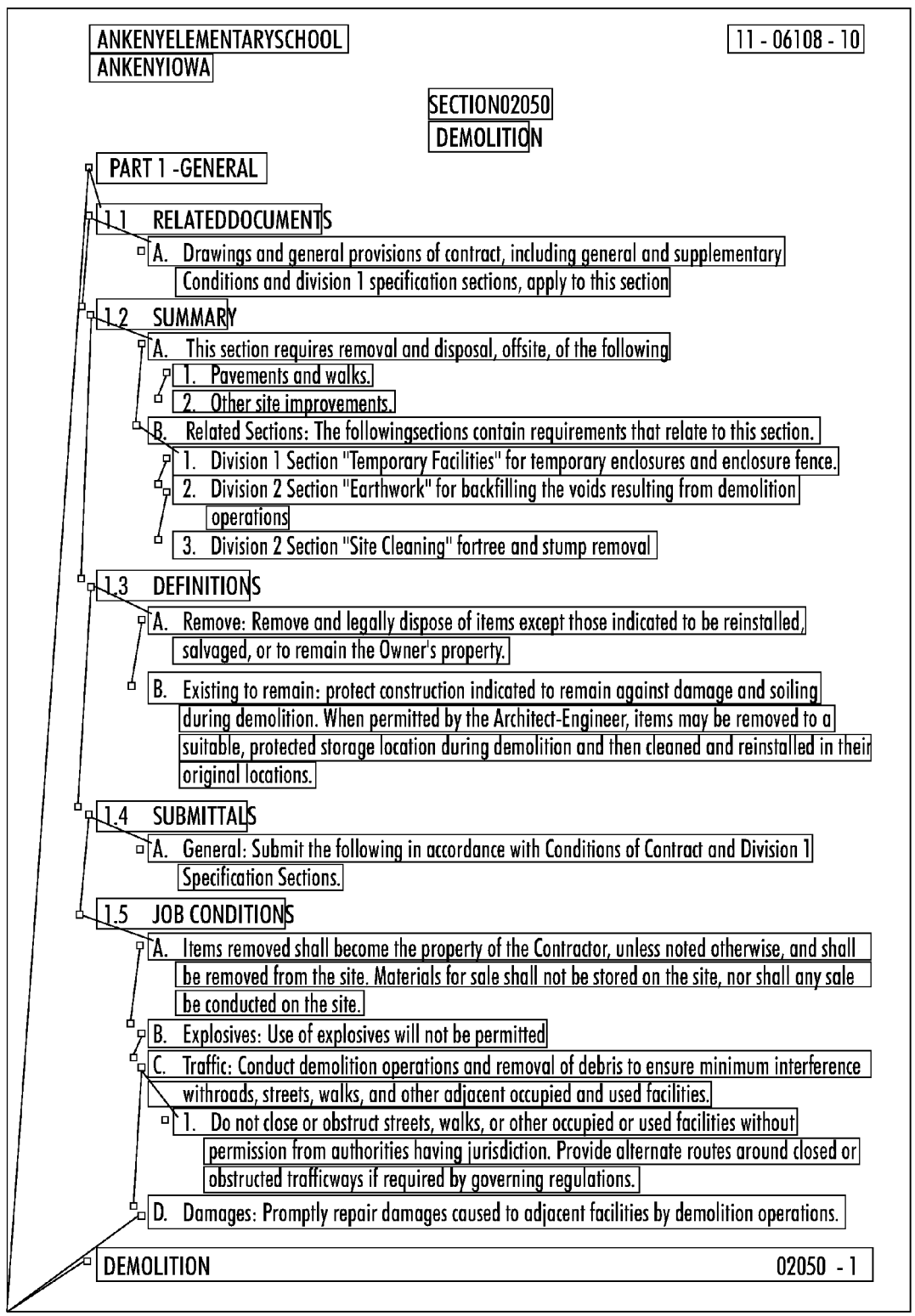
FIG. 5 shows the first page of FIG. 3 but segmented into line text units, with links computed by the numbered sequences detection are diagrammatically indicated.

With reference to FIGS. 3-5, a portion of an illustrative example of the unstructured document 20 is shown, which includes various numbered sequences. The document of FIGS. 3-5 was used in testing the disclosed numbered sequences detector 26. FIGS. 3 and 4 show first and second pages of the document segmented into paragraph text units. FIG. 5 shows the first page segmented into line text units. Also diagrammatically depicted in FIGS. 3-5 are links between numbered items as detected by the numbered sequences detector 26. Note that these links are diagrammatic and do not, for example, show detailed connections between item links that cross between pages 1 and 2.

FIG. 6 shows the numbered items identified by the numbered items identifier 34 and numbered sequences generator 40, as applied to the document of FIGS. 3-4 segmented into paragraph text units. The indexes of the singletons (that is, a sequence composed of a single item) are not instantiated during the numbered sequence generation performed by the numbered sequences generator 40 in accordance with Algorithm 1, because there is no "sequence" in which to instantiate them (that is, no preceding or next item). In the specific case where the list of possible indexes has only one possible index, this value can be given as default value.

For the specific example of FIG. 6, one missing index has been detected, namely between 1.2 Division 1 Section [ . . . ] and 1.3 Division 2 Section [ . . . ]. This is due to a segmentation error in that Section 1.2(B)(1) and Section 1.2(B)(2) are incorrectly merged as a single paragraph text unit (see FIG. 3). One error has also been generated in this example, namely an erroneous link between 2.1 MATERIALS and 3.1 PREPARATION (see FIG. 4). This erroneous link is due to the fact that 2.1 MATERIALS is a singleton (a section 2.2, if present, would have prevented the erroneous link between 2.1 and 3.1). This erroneous link was later corrected during the optimization performed by the components 44, 46.

The optimization context identification was performed on the sequences of FIG. 6 for the document example of FIGS. 3 and 4 using the optimization context identifier 44 employing Algorithm 2. This processing correctly identified that the numbered sequence of the type matching the numbered item token pattern "PART D." does not have any optimization context. In terms of overall document structure, this reflects the fact that the numbered sequence of the pattern type "PART D." is at the highest hierarchical level and hence is not "contained" by any higher level sequence. The other contexts were also correctly recognized, namely: numbered sequences of the type "D.D" were recognized as having as optimization context the numbered sequence of type "PART D."; numbered sequences of the type "X." were recognized as having as optimization context the numbered sequence of type "D.D"; and numbered sequences of the type "D." were recognized as having as optimization context the numbered sequence of type "X.".

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A numbered sequences detector comprising:
   a digital processor configured to perform a method operating on a document comprising an ordered sequence of text units, the method including the operations of:
      (i) extracting one or more numbered item token patterns from the document, each numbered item token pattern including an incremental portion defining at least one index and a fixed portion, each numbered item token pattern matching at least one text unit of the document wherein said matching includes matching the incremental portion of the numbered item token pattern with an index value for the text unit of the document defined by one or more tokens of the text unit of the document, and
      (ii) identifying at least one numbered sequence in the document conforming with a matching numbered item token pattern of the extracted one or more numbered item token patterns, each identified numbered sequence comprising an ordered sub-sequence of text units of the document wherein:
         the identifying includes matching each text unit of the ordered sub-sequence of text units of the document with the matching numbered item token pattern including matching the incremental portion of the matching numbered item token pattern with an index value of the text unit of the document defined by one or more tokens of the text unit of the document, and
         the index values of the ordered sub-sequence of text units of the document that comprise the numbered sequence have an incremental relationship.

2. The numbered sequences detector as set forth in claim 1, wherein the ordered sequence of text units is selected from a group consisting of:
   an ordered sequence of grammatical sentences, and
   an ordered sequence of lines of text.

3. The numbered sequences detector as set forth in claim 1, wherein the extracting operation (i) includes extracting a numbered item token pattern that matches text units of an ordered sub-sequence of text units of the document wherein the index values of the text units matching the incremental portion of the numbered item token pattern conform with an encoding table defining an incremental relationship.

4. The numbered sequences detector as set forth in claim 1, wherein the extracting operation (i) includes extracting a numbered item token pattern that matches text units of an ordered sub-sequence of text units of the document wherein the index values of the text units matching the incremental portion of the numbered item token pattern conform with an alphabetical or numerical sequence incremental relationship.

5. The numbered sequences detector as set forth in claim 1, wherein the identifying operation (ii) includes identifying numbered items comprising text units of the document that match at least one of the extracted one or more numbered item token patterns and dividing the numbered items into at least one numbered sequence.

6. The numbered sequences detector as set forth in claim 1, wherein the digital processor is further configured to perform the method which conditional upon the identifying operation (ii) identifying a plurality of numbered sequences in the document further includes:
   (iii) identifying an optimization context for a second type of numbered sequence as a first type of numbered sequence different from the second type of numbered sequence; and
   (iv) optimizing at least one numbered sequence of the second type under the constraints that:
      (I) a numbered sequence of the second type does not contain any text unit belonging to a numbered sequence of the first type and
      (II) no more than one numbered sequence of the second type is disposed between any two consecutive text units of an ordered sub-sequence of text units comprising a numbered sequence of the first type.

7. The numbered sequences detector as set forth in claim 6, wherein the optimization context identifying operation (iii) includes (iii)(a) quantifying compliance with criterion (I) and criterion (II) of numbered sequences of the first and second types identified in the identification operation (ii) and (iii)(b) identifying the optimization context based on the quantified compliance satisfying a selection criterion.

8. The numbered sequences detector as set forth in claim 7, wherein the quantifying operation (iii)(a) counts occurrences of numbered sequences of the second type between consecutive text units of numbered sequences of the first type and the selection criterion of operation (iii)(b) is that a majority of consecutive text units of numbered sequences of the first type have counts of one or zero for operation (iii)(a).

9. The numbered sequences detector as set forth in claim 6, wherein the optimizing operation (iv) includes (iv)(a) assigning weights to text units of one or more numbered sequences of the second type based on similarity with a model of said text units of said one or more numbered sequences of the second type and (iv)(b) optimizing said one or more numbered sequences of the second type based on the assigned weights.

10. The numbered sequences detector as set forth in claim 9, wherein the optimizing (iv)(b) employs a Viterbi optimization algorithm.

11. The numbered sequences detector as set forth in claim 6, wherein the digital processor is further configured to perform the method which further includes (v) assigning hierarchy information to the numbered sequences including at least assigning numbered sequences of the first type a relatively higher hierarchical level and assigning numbered sequences of the second type a relatively lower hierarchical level.

12. A document processing system comprising:
   a numbered sequences detector as set forth in claim 1; and
   a document structuring processor comprising a digital processor that is the same as or different from the digital processor of the numbered sequences detector and that is configured to generate a structured document that (1) corresponds to a document comprising an ordered sequence of text units and (2) includes structuring based on one or more numbered sequences identified in the document by the numbered sequences detector.

13. A method operating on a document comprising an ordered sequence of text units, the method comprising:

extracting one or more numbered item token patterns from the document, each numbered item token pattern including an incremental portion and a fixed portion, each numbered item token pattern matching text units of an ordered sub-sequence of text units of the document wherein:

for each text unit of the ordered sub-sequence of text units said matching includes matching the incremental portion of the numbered item token pattern with an index value defined by one or more tokens of the text unit, and wherein the index values of the text units of the ordered sub-sequence of text units conform with an expected incremental relationship for the incremental portion of the numbered item token pattern defined by (1) an incremental relationship encoding table or (2) an alphabetical or numerical sequence; and identifying at least one numbered sequence in the document conforming with a matching numbered item token pattern of the extracted one or more numbered item token patterns, each identified numbered sequence comprising an ordered sub-sequence of text units of the document that match the matching numbered item token pattern with portions of the text units matching the incremental portion of the matching numbered item token pattern defining index values having the expected incremental relationship;

wherein the extracting and the identifying are performed by a computer.

14. The method as set forth in claim 13, wherein the identifying identifies a plurality of numbered sequences in the document and the method further comprises:

determining that a second type of numbered sequence nests in the document between consecutive text units belonging to a numbered sequence of a first type; and optimizing one or more numbered sequences of the second type based on information provided by the determining.

15. The method as set forth in claim 13, wherein the identifying identifies a plurality of numbered sequences in the document and the method further comprises:

determining that a second type of numbered sequence nests in the document between consecutive text units belonging to a numbered sequence of a first type; and assigning hierarchy information to the numbered sequences including at least assigning numbered sequences of the first type a relatively higher hierarchical level and assigning numbered sequences of the second type a relatively lower hierarchical level.

16. The method of claim 13 further comprising:

using a computer, generating a structured document based on the document comprising an ordered sequence of text units and structured in accordance with the identified at least one numbered sequence.

17. A non-transitory storage medium storing instructions executable by a digital processor to perform a method including:

identifying numbered sequences of at least two different sequence types in a document comprising an ordered sequence of text units wherein each numbered sequence comprises an ordered sub-sequence of text units of the document in which the text units of the numbered sequence have an incremental portion indicative of the sequence type, from amongst the identified numbered sequences of at least two different types, identifying a numbered sequence of a first type having consecutive text units bounding a nested numbered sequence of a second type different from the first type, and adjusting at least one numbered sequence of the second type based on the constraint that it must be bounded by consecutive text units of a numbered sequence of the first type.

18. The non-transitory storage medium as set forth in claim 17, wherein the stored instructions are further executable by a digital processor to perform a method including extracting a plurality of different numbered item token patterns from the document, each numbered item token pattern including an incremental portion and a fixed portion that matches at least one text unit of the document, the numbered sequences identification utilizing the plurality of different numbered item token patterns for identifying the numbered sequences in the document.

19. The non-transitory storage medium as set forth in claim 17, wherein the adjusting at least one numbered sequence of the second type based on the constraint that it must be bounded by consecutive text units of a numbered sequence of the first type includes optimizing the numbered sequence of the second type under the constraints that:

(I) the numbered sequence of the second type does not contain any text unit belonging to a numbered sequence of the first type and (II) no more than one numbered sequence of the second type is disposed between any two consecutive text units of an ordered sub-sequence of text units comprising a numbered sequence of the first type.

20. The non-transitory storage medium as set forth in claim 17, wherein the stored instructions are further executable by a digital processor to assign hierarchy information to the numbered sequences including at least assigning numbered sequences of the first type a relatively higher hierarchical level and assigning numbered sequences of the second type a relatively lower hierarchical level.

* * * * *